US007629940B2

(12) United States Patent
Ke et al.

(10) Patent No.: US 7,629,940 B2

(45) Date of Patent: Dec. 8, 2009

(54) MULTI-BAND ANTENNA

(75) Inventors: Yun-Long Ke, Tu-Cheng (TW); Chen-Ta Hung, Tu-Cheng (TW); Lung-Sheng Tai, Tu-Cheng (TW); YaoO-Shien Huang, Tu-Cheng (TW); Po-Kang Ku, Tu-Cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 113 days.

(21) Appl. No.: 11/824,783

(22) Filed: Jul. 3, 2007

(65) Prior Publication Data

US 2008/0007460 A1 Jan. 10, 2008

(30) Foreign Application Priority Data

Jul. 10, 2006 (TW) .............................. 95125031 A

(51) Int. Cl.
*H02Q 1/24* (2006.01)
*H01Q 1/48* (2006.01)

(52) U.S. Cl. ....................................... 343/846; 343/702

(58) Field of Classification Search ................. 343/702, 343/846

See application file for complete search history.

(56) References Cited

U.S. PATENT DOCUMENTS 6,342,860 B1 * 1/2002 Haussler et al. ............. 343/702
2004/0080457 A1 * 4/2004 Guo et al. ............. 343/700 MS

FOREIGN PATENT DOCUMENTS

| | | |
|---|---|---|
| TW | 587847 | 5/2004 |
| TW | M284088 | 12/2005 |

* cited by examiner

*Primary Examiner*—Douglas W Owens
*Assistant Examiner*—Jennifer F Hu
(74) *Attorney, Agent, or Firm*—Wei Te Chung; Andrew C. Cheng; Ming Chieh Chang

(57) ABSTRACT

A multi-band antenna includes a radiating element comprising a first metal patch, a second metal patch extending along a direction different from the first metal patch, a grounding element parallel to the radiating element with a certain distance, a resonant cavity produced by said certain distance between separated the radiating element and the grounding element, a first pad downward extending from an edge of the first metal patch to form a feeding pad, and a second pad downward extending from an edge of the second metal patch to form a grounding pad; wherein the edge from which the first pad extending is bordering the edge of the second metal patch with the second pad.

17 Claims, 3 Drawing Sheets

MULTI-BAND ANTENNA

BACKGROUND OF THE INVENTION

1. Field of the Invention

The present invention relates generally to a multi-band antenna, and more particularly to a small-size patch antenna.

2. Description of the Prior Art

Since the wireless communication technology of using electromagnetic wave to transmit signals has the effect of remote device transmission without cable connection, and further has the mobility advantage, the technology is widely applied to various products, such as moveable phones, notebook computers, intellectual home appliance with wireless communication features. Because these devices use electromagnetic wave to transmit signals, the antenna used to receive electromagnetic wave also becomes a necessity in the application of the wireless communication technology. In present electronic devices, antennas always be assembled inside the electronic devices to make the appearance of the device beauty. Since the limit of the inner space of the electronic device, the height and size of antenna will be restricted. Patch antennas, as a kind of antenna, has small height. TW Patent No. 587847 disclosed a small-size multi-band patch antenna referencing to FIG. 1. The patch antenna comprises a signal element 21' having a plate 211' extending from a bar 42' and a plate 212' extending from the bar 42 opposite to a plate 211', a grounding element 22' tabulated and parallel to the signal portion 21', a resonant cavity 231' produced by a space formed between the signal element 21' and the grounding element 22' and at least a metal slip 43' with a proper length and bending to form a long piece 431' and a short piece 432'. The long piece 431' is parallel to the grounding element 22'. The antenna has two feeding point respectively on the long piece 431' and the signal element 21'. A extending section 41' extends from the signal element 21' to regulate the impedance matching. So the structure of the antenna is complex. TW Patent No. 284088 discloses a multi-band invert-F patch antenna. The antenna uses a grounding portion assembly which connects to a grounding element to regulate the impedance matching to ensure enough band width of the antenna. The additional grounding portion makes the structure complex. Besides, the antenna needs to be assembled on an insulative substrate, therefore, it may be not fit for the inner space of the electronic device.

Hence, an improved antenna is desired to overcome the above-mentioned shortcomings of the existing antennas.

BRIEF SUMMARY OF THE INVENTION

A primary object, therefore, of the present invention is to provide a multi-band antenna with small size, simple structure and flat mode.

In order to implement the above object and overcomes the above-identified deficiencies in the prior art, the multi-band antenna comprises a radiating element comprising a first metal patch, a second metal patch extending along a direction different from the first metal patch, a grounding element parallel to the radiating element with a certain distance, a resonant cavity produced by said certain distance between separated the radiating element and the grounding element, a first pad downward extending from an edge of the first metal patch to form a feeding pad, and a second pad downward extending from an edge of the second metal patch to form a grounding pad; wherein the edge from which the first pad extending is bordering the edge of the second metal patch with the second pad.

Other objects, advantages and novel features of the invention will become more apparent from the following detailed description of a preferred embodiment when taken in conjunction with the accompanying drawings.

DETAILED DESCRIPTION OF THE INVENTION

Reference will now be made in detail to a preferred embodiment of the present invention.

Figure 1:
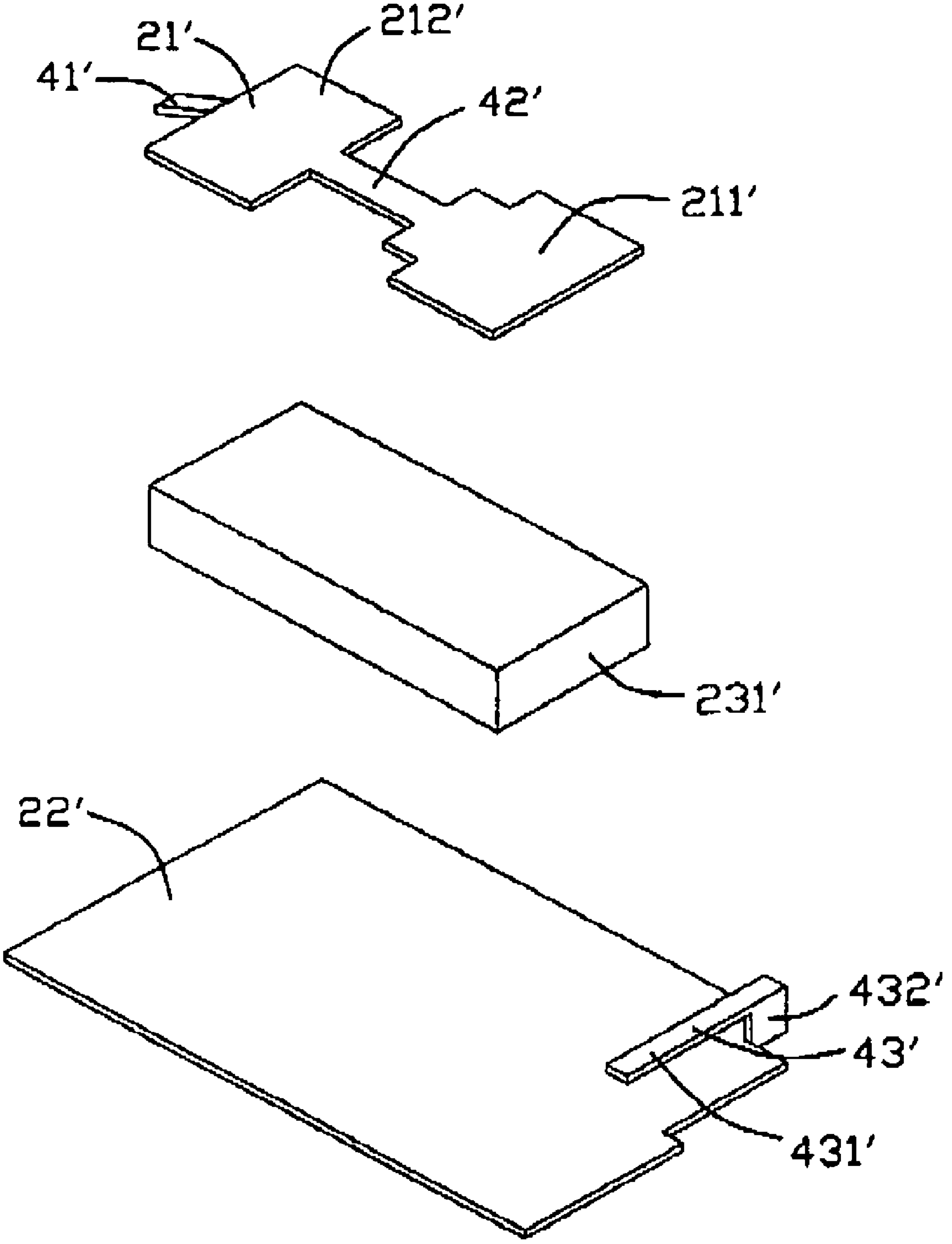
FIG. 1 (PRIOR ART)
FIG. 1 is a perspective view of a conventional multi-band patch antenna.
Figure 2:
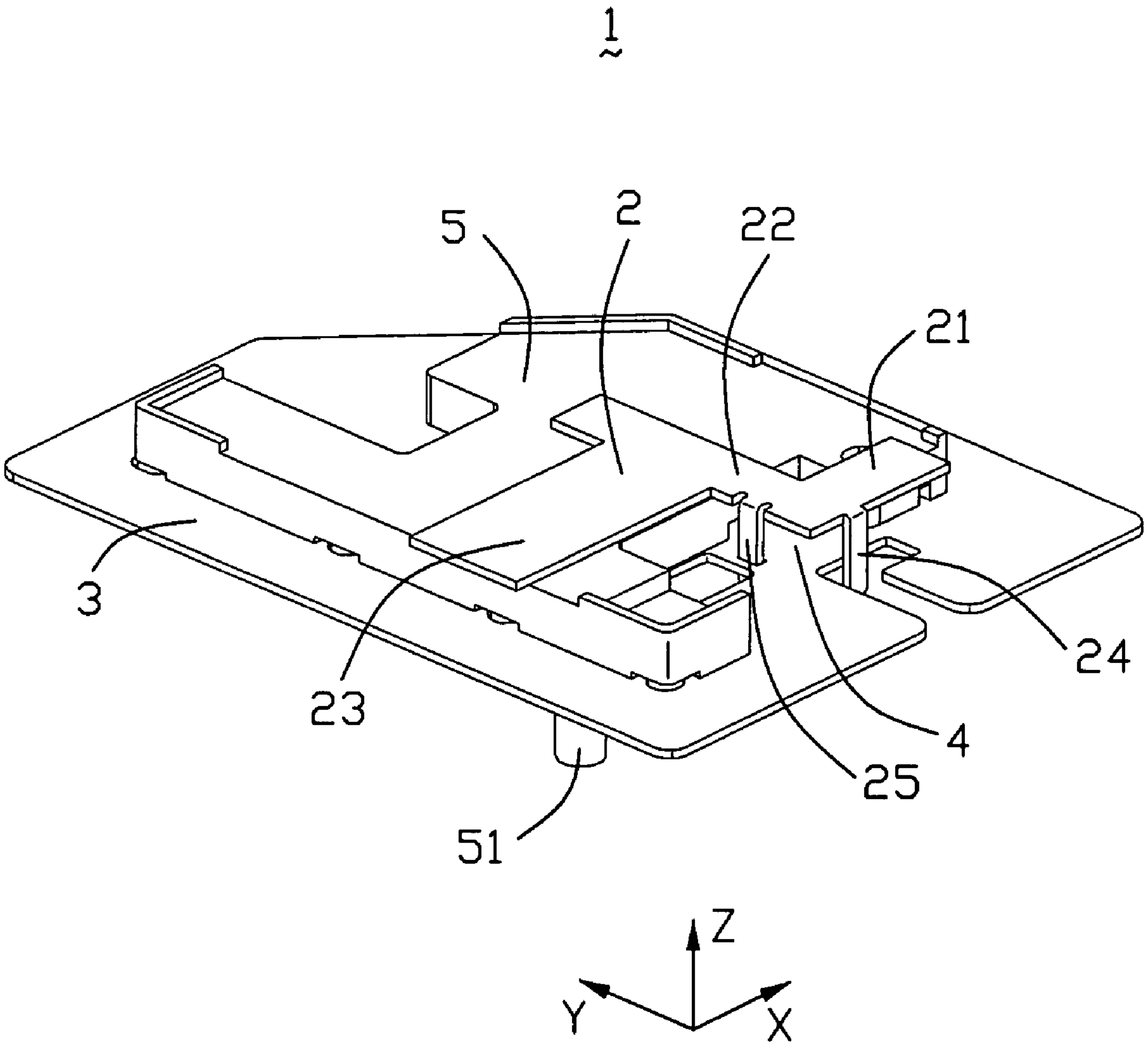
FIG. 2 is a perspective view illustrating a multi-band antenna of preferred embodiment of the present invention.
Figure 3:
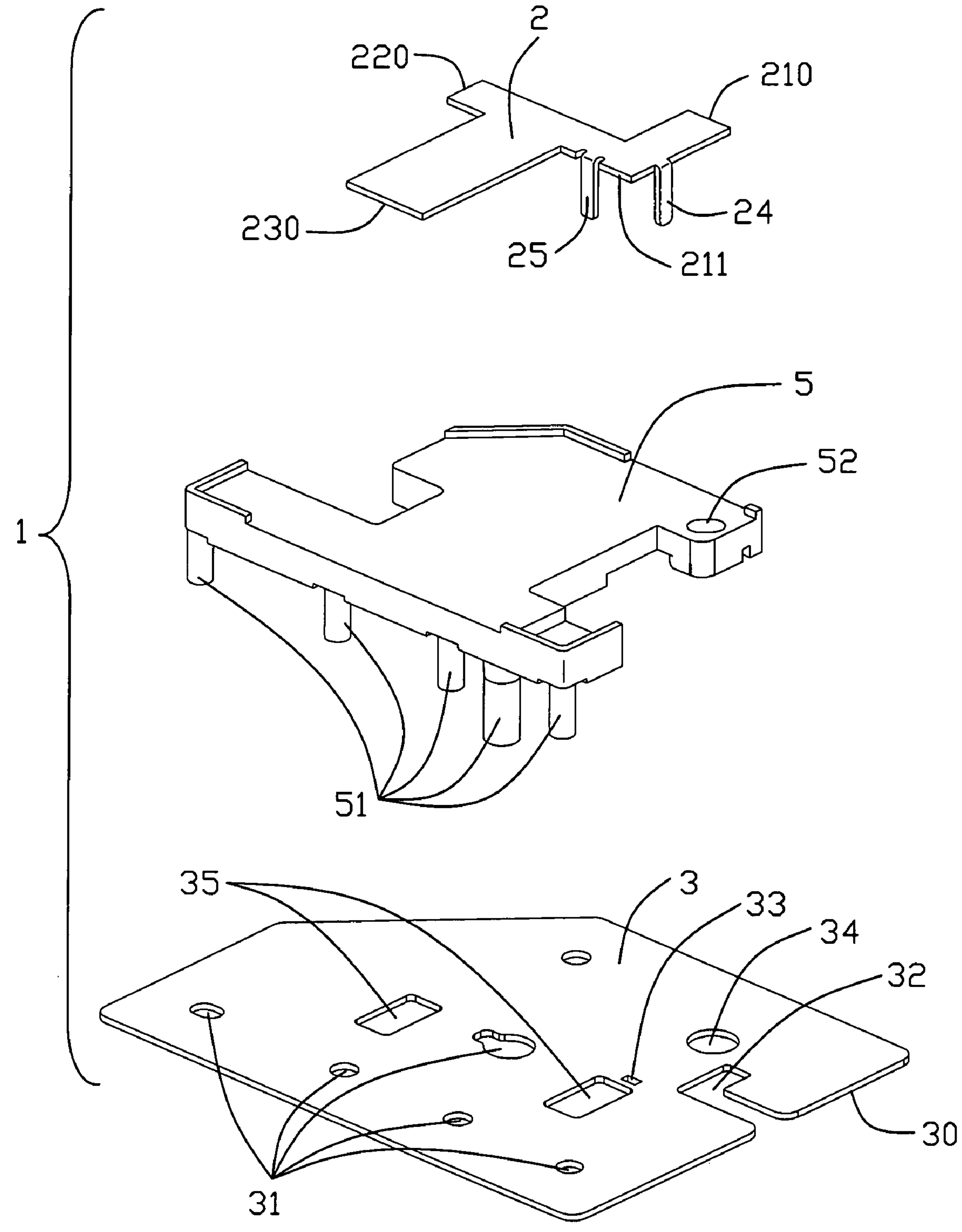
FIG. 3 is a exploded and perspective view of FIG. 2.

Reference to FIG. 2 to FIG. 3, perspective views of a multi-band antenna 1 in accordance with a preferred embodiment of the present invention are shown.

The multi-band antenna 1 comprises a Z-shaped radiating element 2 and a grounding element 3. The radiating element 2 comprises a first metal patch 21, a second metal patch 22 and a third metal patch 23. The first metal patch 21 extends from its beginning edge 211 to an end 210 in a direction along the plus X axis. The second metal patch 22 extends from the first metal patch 21 to an end 220 in a direction along the plus Y axis. The third metal patch 23 extends from the second metal patch 22 to an end 230 in a direction along the minus X axis. And there is a distance between the end 220 and the third metal patch 23. A first pad 24 is connected to the first metal patch 21 on a point which is far from the end 210 and extends downward from the first metal patch 21 in a perpendicular direction to the first metal patch 21. A second pad 25 is connected to the second metal patch 22 on a point which is adjacent to the first metal patch 22. The grounding element 3 is polygonal and comprises a side edge 30, some holes 31 with different shapes, an L-shape cutout 32 entad extending from the side edge 30, a rectangular notch 33, a circular fixing aperture 34 and two rectangular opens 35. A part of the holes 31 is adjacent to an edge different from and bordering the side edge 30. The radiating element 2 is separated from the grounding element 3 in vertical direction to form a resonant cavity 4. For keeping the distance between the radiating element 2 and the grounding element 3 well, a plastic substrate 5 is fastened between the radiating element 2 and the grounding element 3. The height of the plastic substrate 5 is certain, and the radiating element 2 is set on the topside of the plastic substrate 5 and the grounding element 3 is set on the underside of the plastic substrate 5. The plastic substrate 5 comprises some posts 51 extending from the undersurface thereof in a direction perpendicular to the plastic substrate 5 to fasten the plastic substrate 5 with the radiating element 2 to the grounding element 3 and a hole 52 therethrough to assemble the plastic substrate 5 and the grounding element 3 together to the electronic device through the fixing aperture 34 corresponding with the plastic substrate 5. The two rectangular opens 35 of the grounding element 3 are on the two opposite sides of the plastic substrate 5. In other embodiment, the plastic substrate 5 also can be made from other insulative material and be omitted. The first pad 24 goes through the cutout 32 without touching the grounding element 3, and the second pad 25 goes through the notch 33. The first pad 24 is connected to a feeding line (not shown) to form a feeding pad with a feeding point and the second pad 25 is connected to the grounding element 3 to form a grounding pad with a grounding point.

The first metal patch 21 of the radiating element 2 is used to receive and send a high frequency signal (5 GHz) to form a first frequency band. The third metal patch 23 is used to receive and send a low frequency signal (2 GHz) to form a second frequency band. In this antenna, the distance between the grounding point and the feeding point has a great influence to the impedance matching which is an important parameter of the antenna, thus, when the height of the antenna is reduced, the enough distance is provided by adjusting the distance between the grounding point and the feeding point. Thus, that adjust the distance between the first pad 24 and the second pad 25 can achieve the intent of matching impedance. The second metal patch 22 is beyond the third metal patch 23 to form an extrusive metal patch to adjust the impedance matching better. In this embodiment, the first metal patch 21 is 9.36 mm. The first pad 24 has a length of 2.00 mm. The length of the second metal patch is 11.30 mm. The distance between the second pad 25 and the end of the second metal patch 22 is 10.90 mm. The antenna is able to achieve wider band width through regulating the length, width, or position of the second metal patch 22.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

What is claimed is:

1. A multi-band antenna, comprising:

a radiating element comprising a first metal patch, a second metal patch extending along a direction different from the first metal patch, a third metal patch extending from the second metal patch in a direction perpendicular to the second metal patch;

a grounding element parallel to the radiating element with a certain distance;

a resonant cavity produced by said certain distance between the radiating element and the grounding element;

a first pad downward extending from an edge of the first metal patch to form a feeding pad; and a second pad downward extending from an edge of the second metal patch to form a grounding pad;

wherein the first metal patch is wider than the second metal patch, the third metal patch is wider than the first metal patch, the edge from which the first pad extends is neighboring the edge of the second metal patch with the second pad.

2. The multi-band antenna as claimed in claim 1, wherein the second metal patch extends from the first metal patch in a direction perpendicular to the first metal patch.

3. The multi-band antenna as claimed in claim 2, wherein said second metal patch comprises an extrusive metal patch perpendicular and connected to the third patch and the third metal patch is parallel to the first metal patch.

4. The multi-band antenna as claimed in claim 2, wherein said first metal patch works at a frequency of 5 GHz and the third metal patch works at a frequency of 2.5 GHz.

5. The multi-band antenna as claimed in claim 1, wherein said first pad connects the first metal patch on a point apart from the end of the first metal patch with a distance, and the second pad connects the second metal patch on a point adjacent to but apart from the first metal patch.

6. The multi-band antenna as claimed in claim 1, wherein the position of said first pad and second pad are adjustable for the need of impedance matching of the multi-band antenna.

7. The multi-band antenna as claimed in claim 1, wherein said grounding element comprises a cutout to provide an alleyway for the first pad going through, a notch to provide a way for the second pad going through.

8. The multi-band antenna as claimed in claim 1, wherein said multi-band antenna comprises an insulative substrate between the radiating element and the grounding element, wherein the radiating element is on the top of the insulative substrate and the grounding element is below the insulative substrate.

9. The multi-band antenna as claimed in claim 8, wherein said grounding element comprises some holes, said insulative substrate comprises some posts corresponding to the holes, and the posts goes through the holes to fasten the insulative substrate with the radiating element on the grounding element.

10. The multi-band antenna as claimed in claim 9, wherein said insulative substrate is a plastic substrate.

11. The multi-band antenna as claimed in claim 8, wherein said first pad and second pad are on the same side of the insulative substrate.

12. The multi-band antenna as claimed in claim 8, wherein said grounding element also comprises a pair of opens respectively on the two sides of the insulative substrate.

13. A multi-band antenna, comprising:

a radiating element comprising a first metal patch, a second metal patch unitarily extending horizontally along a direction different from the first metal patch, and a third metal patch extending from the second metal patch in a direction perpendicular to the second metal patch, wherein the first metal patch is wider than the second metal patch and the third metal patch is wider than the first metal patch;

a grounding element being discrete and spaced from the radiating element with a certain distance;

a resonant cavity produced by said certain distance between separated the radiating element and the grounding element;

a first pad, independent from the grounding element downward extending unitarily from an edge of the first metal patch to form a feeding pad; and a second pad, independent from the grounding element, downward extending unitarily from an edge of the second metal patch to form a grounding pad; wherein both said feeding pad and said grounding pad extend beyond the grounding element; wherein the grounding element defines a cutout throughout which said first pad downwardly extends without touching the grounding element, and further defines a notch through which the second pad downwardly extends with touching the grounding element.

14. The antenna as claimed in claim 13, wherein said first metal patch and said second metal patch commonly define an L-shaped configuration on which said two edges are located.

15. The antenna as claimed in claim 13, wherein a plastic substrate is located only between the radiating element and the grounding element, and the radiating element and the grounding element are respectively seated upon opposite surfaces of the substrate, the plastic substrate defining in a top view a contour which is larger than that of the radiating element in both lengthwise and transverse directions while both said feeding pad and said grounding pad are located outside of the contour of said plastic substrate.

16. The antenna as claimed in claim 13, wherein said cutout is of an L-shaped configuration in a top view and extends through an edge of the grounding element to communicate transversely with an exterior.

17. The antenna as claimed in claim 13, further including a third metal patch extending from the second metal patch, wherein a plastic substrate is located only between the radiating element and the grounding element, and the radiating element and the grounding element are respectively seated upon opposite surfaces of the substrate, wherein the third metal patch is wider than both said first metal patch and said second metal patch to support said radiating element on the plastic substrate.

* * * * *